J. MANLEY.
Cattle Stanchion.
No. 64,017.
Patented April 23, 1867.
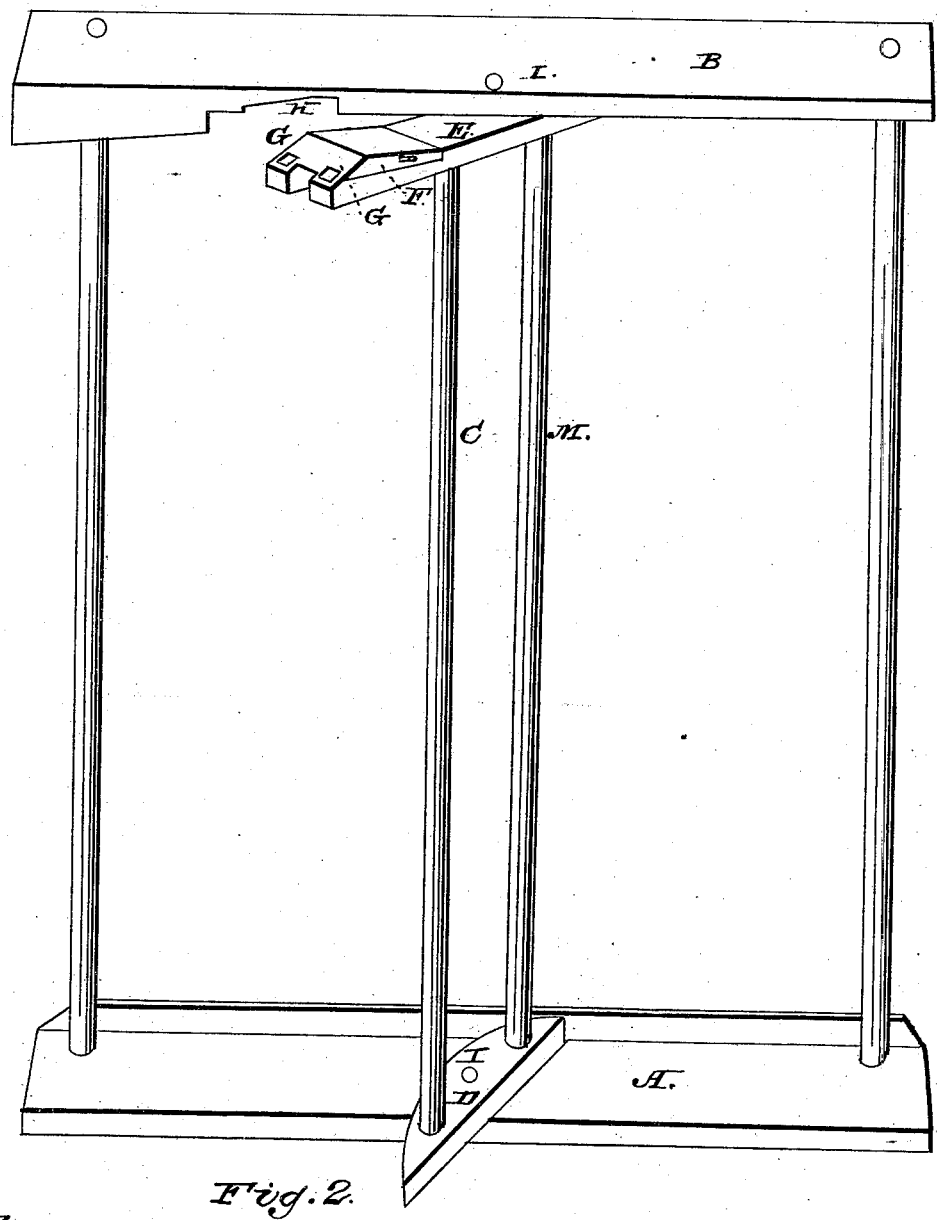

United States Patent Office.

JAMES MANLEY, OF HOPE, MAINE.

Letters Patent No. 64,017, dated April 23, 1867.

---

IMPROVEMENT IN STANCHION FOR CATTLE.

---

The Schedule referred to in these Letters Patent and making part of the same.

---

Be it known that I, JAMES MANLEY, of Hope, in the county of Knox, and State of Maine, have invented a new and useful stanchion for fastening horned cattle in tie-ups in barns, stables, and other places where cattle are kept, and which is to be called "James Manley's Double Swinging Stanchion;" and I hereby declare that the following is a full, clear, and exact description of the construction and operation of the same, reference being had to the annexed drawings, and the letters marked thereon, making a part of this specification.

Calling attention to Figure 1, A represents the bottom piece, and B the top piece, running lengthwise of the common tie-up, and to which the stanchions are fastened, and are to be of wood of sufficient size for the purpose, and may be fastened and kept in place in any way most convenient. For the bottom piece A, perhaps a plank some three or four inches thick, and some eight to ten inches wide, would be as suitable as anything; and then to the crib side of the bottom piece, a strip of wood may be fastened, as represented, and made wide enough to come some three to five inches above said bottom piece, and to serve the double purpose of keeping the hay or feed in the crib, and prevent the part of this stanchion D from turning too far round.

The stanchion is constructed thus: Take two round pieces of hard wood, or wood of any kind of sufficient size and strength to hold the creature to be fastened, represented by C and M, fig. 1. M is fastened permanently to the pieces D and E. C is also fastened into the piece D at the lower end, and when the animal is tied up the pieces C and M stand parallel with each other, and are sufficiently far apart for the animal to stand or lie comfortably, and still be securely fastened. D is a piece of plank some two feet long and some five to seven inches wide, according to the material of which it is made, and some two inches thick, made straight on the side next to the animal, and rounding on the crib side, so as to admit of its turning towards the crib, and is fastened in the centre to the bottom piece A, by a pin, I, of either wood or iron, on which it turns at the will of the animal fastened. E is a strip of plank somewhat similar to D, but may be straight on both sides, and is fastened to the top piece B the same as D is to the bottom piece A, and is prevented from turning clear round either way by a pin inserted into the under and crib side of said top piece B, and exactly in front of the pin I. D may be prevented from turning clear round in a similar manner, by putting a pin into the upper and crib side of the bottom piece A, and exactly in front of the pin I. In the under side and left-hand end (as you face the crib from the tie-up) of the piece E is a groove for the upper end of the piece C to slide back and forth in, as you fasten or unfasten the animal, which groove is continued to the left in the top piece B, which, at that place, is made thicker (in any way most convenient) for that purpose, thus making a place in the top piece B for said part C to rest in when the animal is out, and which keeps the whole stanchion in place, ready to receive the animal when it comes in to be fastened. In the upper side and left-hand end of said piece E, and over said groove, is cut a kind of mortise, some six inches wide, and reaching across said piece E, the right-hand side of it reaching to the sliding piece C, when the animal is fastened, made an inch or so in depth on that side, and running out wedge-like so as not to be more than one-eighth or one-fourth of an inch in depth on the other or left-hand side, as you face the crib from the tie-up; and into this cut or mortise is fitted the wedge-like piece F, which is fastened to the piece E by means of one or two hinges, S, on said left-hand or thin side, and into the under side of said top piece B, at that point, is made another corresponding cut or mortise, H, so as to allow the right-hand or thick side of said piece F to be raised when it is desired to slide the upper end of said piece C to the left, and unfasten the animal. The thick side of said piece F drops down below the upper end of said piece C when the animal is fastened, thus keeping it firm and the animal secure. A pin is inserted into the side of said piece F on the side next the animal, by which it may be raised, to allow the piece C to slide to the left, and when the piece C is slid back to the right, the piece F being wedge-like in form, the upper end of C slides under it, (thus raising it,) to the right-hand end of said groove, when said piece F drops down in place again, and the piece C is thereby kept in place, and the animal fastened, and when the animal is thus fastened, the stanchion is free to turn on said pins I either way, at the will of the animal, till it hits said pins in front of said pins I, on the crib side of said top and bottom pieces A and B.

Figure No. 2 simply shows another view of said grooves, and the operation of the piece C, as it slides back and forth in them. When the animal is to be unfastened, the piece F must be exactly under the corresponding cut or mortise H, so that the groove in E will be perpendicular to the groove in the said thickened part of said top piece B, so that the upper end of C will slide from one groove into the other when the piece F is raised as before described.

What I claim as my invention, and desire to secure by Letters Patent, are—

All the parts of fig. 1 except the top and bottom pieces A and B of the common tie-up, that is, all the parts C M I D E F G which are connected together, and the said grooves, and said cut or mortise H, and the thickened part of said top piece B, (to admit of said groove,) and which make up the double swinging stanchion, which swings both ways, which allows the animal fastened to turn the head either way, as before mentioned, when standing, or lying down, and to lie on either side with ease and comfort.

This stanchion is also very simple in its construction, very easily made, and very cheap in cost, and easily taken from one tie-up and fixed into another.

JAMES MANLEY.

Witnesses:
L. W. HOWES,
EDW. F. CUTTER.